Nov. 6, 1928.

F. W. LANE ET AL.

ICE CREAM CONE

Filed Aug. 21, 1925

1,690,984

WITNESSES

INVENTORS
F. W. Lane,
K. M. Anderson,
BY
ATTORNEYS

Patented Nov. 6, 1928.

1,690,984

UNITED STATES PATENT OFFICE.

FRED W. LANE AND KENNETH M. ANDERSON, OF OAKLAND, CALIFORNIA.

ICE-CREAM CONE.

Application filed August 21, 1925. Serial No. 51,654.

Our present invention relates generally to edible containers and more particularly to edible containers in the matter of ice cream cones, our object being the provision of simple and inexpensive means whereby such containers may be rendered more desirable to the taste and may be made to conform to the tastes of different people.

More particularly our invention aims to provide an ice cream cone having a double wall with a filling between the walls of sweetened cream, icing or other confection which will render the cone as a whole more desirable and tasty.

In the accompanying drawings which illustrate the present invention and forms a part of this specification:—

Figure 1:
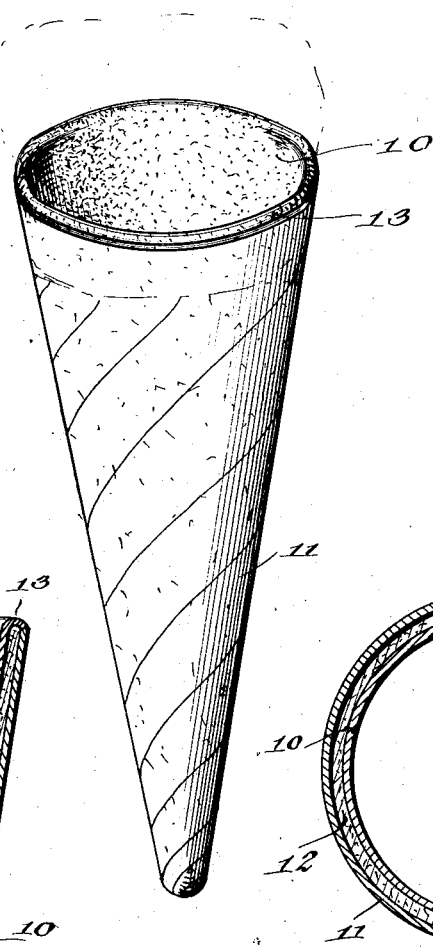
Figure 1 is a perspective view of our complete cone.
Figure 2:
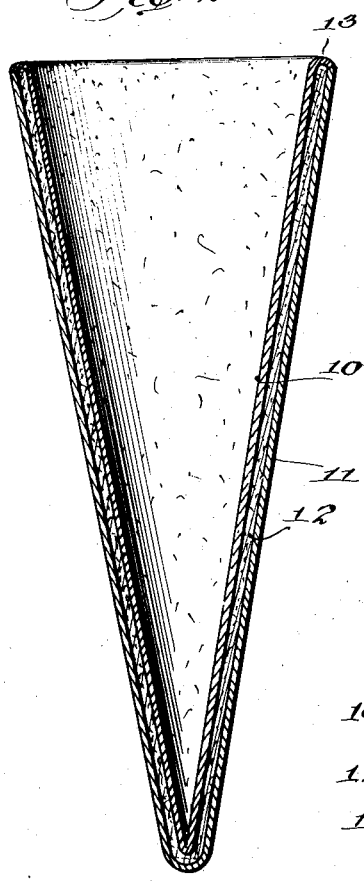
Figure 2 is a vertical longitudinal section therethrough.
Figure 3:
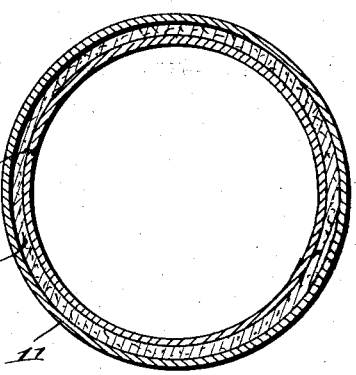
Figure 3 is a transverse section.
Figure 4:
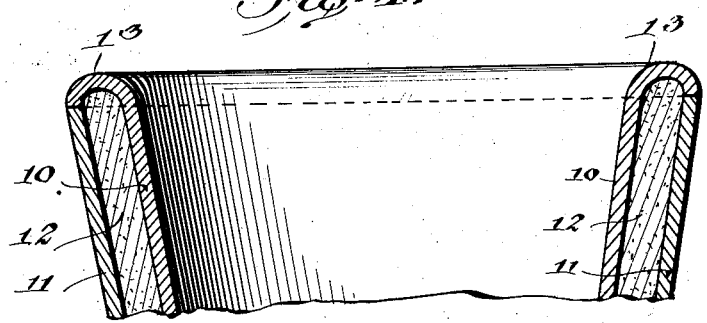
Figure 4 is an enlarged vertical longitudinal section through the upper open end of the cone.

Referring now to these figures, our invention proposes an ice cream cone having generally the shape and form of those at present used, and which is provided with double walls 10 and 11 forming a space 12 between for the full extent of the walls, to receive a filling of sweetened cream, icing or other confection.

The walls 10 and 11 of the cone may be formed of any suitable material as, for instance, the sweetened batter now employed for this purpose, and the outer wall may be formed precisely as is the usual cone. The inner wall 10 will be preferably formed around its upper open end with an outstanding and slightly curved flange 13 adapted to engage the upper surrounding edge of the outer wall and so proportioned that when engaged with the outer wall it will prevent the inner wall 10 from contact with the outer wall at any point below these upper edges.

In the above manner an ample space 12 remains between the walls to receive the confection filling and it is obvious that in practice the filling may be introduced in any suitable manner as by injection in the same way cream puffs and similar confections are filled. Moreover, the flavor and character of this filling may be varied to such an extent as to conform to the flavoring and character of the ice cream to be placed within the cone, as well as the individual tastes of consumers.

Our invention adds but little to the cost of the ordinary ice cream cone and at the same time is such as to render the same highly desirable for the purposes and reasons above stated.

We claim:—

1. An ice cream cone having inner and outer walls of edible baked material, the inner wall being provided at its upper open end with an outstanding annular flange, said flange of the inner wall engaging the upper edge of the outer wall and serving to support the walls in spaced apart relation, and a confection filling in the said space between the walls said flange closing the space between the walls and protecting the confection filling.

2. An ice cream cone having inner and outer walls of edible material, the inner wall being provided around its extreme upper open end with an outstanding annular flange adapted to engage the upper edge of the outer wall when the walls are in spaced apart relation, and a confection filling in the space between the walls, the said flange closing the said space between the walls and protecting the confection filling and being curved to strengthen the same and round off the edge of the cone around its larger end, whereby to minimize danger of breakage.

FRED W. LANE.
KENNETH M. ANDERSON.